(12) United States Patent
Graebe et al.

(10) Patent No.: US 6,564,410 B2
(45) Date of Patent: May 20, 2003

(54) VALVE FOR ZONED CELLULAR CUSHION

(75) Inventors: Robert W. Graebe, Belleville, IL (US); Robert Klotz, Freeburg, IL (US); Paul A. Rickman, Belleville, IL (US)

(73) Assignee: Roho, Inc., Belleville, IL (US)

( * ) Notice: Subject to any disclaimer, the term of this patent is extended or adjusted under 35 U.S.C. 154(b) by 0 days.

(21) Appl. No.: 10/052,101

(22) Filed: Jan. 17, 2002

(65) Prior Publication Data

US 2002/0066143 A1 Jun. 6, 2002

Related U.S. Application Data (60) Provisional application No. 60/262,585, filed on Jan. 18, 2001.

(51) Int. Cl.[7] .......................... A47C 27/10; F16K 11/06
(52) U.S. Cl. ................................ 5/710; 5/713; 5/655.3; 5/654; 137/625.48; 251/325
(58) Field of Search ........................ 5/713, 710, 655.3, 5/654, 706, 644; 251/325, 319; 137/625.48

(56) References Cited

U.S. PATENT DOCUMENTS

| 805,237 | A | 11/1905 | Sears |
|---|---|---|---|
| 1,397,220 | A | 11/1921 | Lord |
| 1,468,072 | A | 9/1923 | Ogle |
| 1,746,953 | A | 2/1930 | McCollum |
| 1,775,856 | A | 9/1930 | Hauser |
| 1,821,719 | A | 9/1931 | Messier |
| 1,935,119 | A | 11/1933 | Guild |
| 1,970,803 | A | 8/1934 | Johnson |
| 2,078,402 | A | 4/1937 | McDonough et al. |
| 2,163,510 | A | 6/1939 | Jensen |
| 2,182,982 | A | 12/1939 | Evans |
| 2,260,437 | A | 10/1941 | Chambers |
| 2,434,641 | A | 1/1948 | Burns |
| 2,575,764 | A | 11/1951 | Morner |
| 2,645,450 | A | 7/1953 | Chessman |
| 2,731,652 | A | 1/1956 | Bishop |
| 2,838,099 | A | 6/1958 | Warner |
| 2,858,851 | A | 11/1958 | Holl |
| 2,906,492 | A | 9/1959 | Conrad |
| 3,000,399 | A | 9/1961 | Brukner |
| 3,044,491 | A | 7/1962 | Sangster |
| 3,112,956 | A | 12/1963 | Schick et al. |
| 3,192,540 | A | 7/1965 | Swank |
| 3,192,541 | A | 7/1965 | Moore |
| 3,200,846 | A | 8/1965 | Beck |
| 3,215,163 | A | 11/1965 | Henderson |
| 3,303,518 | A | 2/1967 | Ingram |
| 3,308,851 | A | 3/1967 | Zuludow |
| 3,385,113 | A | 5/1968 | Harris |

(List continued on next page.)

FOREIGN PATENT DOCUMENTS

| DE | 1951476 | 10/1969 |
|---|---|---|
| WO | 9913814 | 3/1999 |

OTHER PUBLICATIONS

Conform Roho Incorporated; The Roho Quadtro Cushion.

*Primary Examiner*—Robert G. Santos
(74) *Attorney, Agent, or Firm*—Polster, Lieder, Woodruff & Lucchesi, L.C.

(57) ABSTRACT

A valve for use with an inflatable cushion having individual inflation zones including a casing with an internal bore and a plurality of openings along the length of the casing connected to the individual inflation zones by air conduits and a movable slide within the casing bore. The slide has a number of openings along the its length that communicate with an inner bore. The valve is opened by aligning the slide openings with the casing openings to allow the inflation zones to communicate through the valve slide bore and is closed by moving the slide openings out of alignment with the casing openings to seal off the inflation zones.

20 Claims, 10 Drawing Sheets

U.S. PATENT DOCUMENTS

| | | |
|---|---|---|
| 3,462,778 A | 8/1969 | Whitney |
| 3,527,256 A | 9/1970 | Colombo |
| 3,605,145 A | 9/1971 | Graebe |
| 3,678,959 A | 7/1972 | Liposky |
| 3,707,168 A | 12/1972 | Boelkins |
| 3,740,777 A | 6/1973 | Dee |
| 3,763,891 A | 10/1973 | Stiltner |
| 3,806,084 A | 4/1974 | Seese |
| 3,828,821 A | 8/1974 | Dotter |
| 3,870,450 A | 3/1975 | Graebe |
| 3,893,481 A | 7/1975 | Watts |
| 3,982,786 A | 9/1976 | Burgin et al. |
| 3,984,886 A | 10/1976 | Keeton |
| 4,005,236 A | 1/1977 | Graebe |
| 4,161,794 A | 7/1979 | Darnfors |
| 4,182,374 A | 1/1980 | Spanides |
| 4,186,734 A | 2/1980 | Stratton |
| 4,219,532 A | 8/1980 | Messervey et al. |
| 4,231,399 A | 11/1980 | Pauliukonis |
| 4,267,611 A | 5/1981 | Agulnick |
| 4,279,044 A | 7/1981 | Douglas |
| 4,370,769 A | 2/1983 | Herzig et al. |
| 4,422,194 A | 12/1983 | Viesturs et al. |
| 4,541,136 A | 9/1985 | Graebe |
| 4,592,589 A | 6/1986 | Hellwig |
| 4,662,012 A | 5/1987 | Torbet |
| 4,690,171 A | 9/1987 | Johnston |
| 4,698,864 A | 10/1987 | Graebe |
| 4,852,195 A | 8/1989 | Schulman |
| 4,864,671 A | 9/1989 | Evans |
| 4,893,367 A | 1/1990 | Heimreid et al. |
| 5,052,068 A | 10/1991 | Graebe |
| 5,090,076 A | 2/1992 | Guldager |
| 5,111,544 A | 5/1992 | Graebe |
| 5,163,196 A | 11/1992 | Graebe et al. |
| 5,373,595 A | 12/1994 | Johnson et al. |
| 5,444,881 A | 8/1995 | Landi et al. |
| 5,502,855 A | 4/1996 | Graebe |
| 5,564,143 A | 10/1996 | Pekar et al. |
| 5,678,265 A | 10/1997 | Meyer |
| 5,689,845 A | 11/1997 | Sobieralski |
| 5,765,594 A | 6/1998 | Collins et al. |
| 5,772,182 A | 6/1998 | Stambaugh, Sr. et al. |
| 5,839,140 A | 11/1998 | Wilkerson |
| 5,920,934 A | 7/1999 | Hannagan et al. |
| 6,058,538 A | 5/2000 | Chapman et al. |
| 6,122,785 A | 9/2000 | Bondie et al. |
| 2002/0066143 A1 * | 6/2002 | Graebe et al. ........... 5/710 |

* cited by examiner

VALVE FOR ZONED CELLULAR CUSHION

CROSS-REFERENCE TO RELATED APPLICATIONS

This application claims priority to provisional application Serial No. 60/262,585, filed Jan. 18, 2001.

BACKGROUND OF THE INVENTION

This invention relates in general to inflatable mattresses and cushions and, more particularly, to an improved valve for use with an inflatable mattress or cushion having normally isolated zones to place the normally isolated zones in communication with each other or with the atmosphere in any desired arrangement of communication.

Those individuals who are confined to wheelchairs run the risk of tissue breakdown and the development of pressure sores, which are extremely dangerous and difficult to treat and cure. Typically, much of the individual's weight concentrates in the region of the ischia, that is, at the bony prominence of the buttocks, and unless frequent movement occurs, the flow of blood to the skin tissue in these regions decreases to the point that the tissue breaks down. Cushions that are especially designed for wheelchairs exist for reducing the concentration of weight in the region of the ischia, and these cushions generally seek to distribute the user's weight more uniformly over a larger area of the buttocks.

Cellular cushions provide the most uniform distribution of weight and thus provide the greatest protection from the occurrence of pressure sores. These cushions have an array of closely spaced air cells that project upwardly from a common base. Within the base the air cells communicate with each other, and thus, all exist at the same internal pressure. Hence, each air cell exerts essentially the same restoring force against the buttocks, irrespective of the extent to which it is deflected. U.S. Pat. No. 4,541,136 shows a cellular cushion currently manufactured and sold by ROHO, Inc. of Belleville, Ill., for use on wheelchairs.

In a sense the typical cellular cushion provides a highly displaceable surface that tends to float the user. While this reduces the incidence of pressure sores, it detracts from the stability one usually associates with a seating surface. Most of those confined to wheelchairs have little trouble adjusting to the decrease in stability, but for those who have skeletal deformities, particularly in the region of the pelvis and thighs, and for those who lack adequate strength in their muscles, lesser stability can be a source of anxiety. A variation of the ROHO cellular cushion addresses this problem with totally isolated zones and also with cells of varying height. By varying the volume of air between zones, for example, one can accommodate for skeletal deformities while still maintaining satisfactory protection against pressure sores. U.S. Pat. No. 4,698,864 shows zoned cellular cushion with cells of varying height.

Typically, a zoned cellular cushion has a separate filling stem and valve for each of its zones. The user simply opens the valve of each stem and introduces air into the zone for the stem, usually with a hand pump, and then releases the air from the zones until the desired posture is achieved. In a more sophisticated arrangement, a hose kit connects a single pump to a manifold which in turn is connected to the several valves through separate hoses. Those hoses are fitted with separate hose clamps so that the air from the pump may be directed to the cells of the individual zones independently. Likewise, the air can be released from them independently, all by manipulating the clamps.

The hoses of the hose kit lie externally of the cushion and may become entangled in the components of a wheelchair. Furthermore, by reason of their remote locations, the hose clamps are difficult to manipulate. Examples of zoned inflatable cushions that demonstrate significant advantages from zoning are provided in U.S. Pat. No. 5,163,196 and U.S. Pat. No. 5,502,855. The '196 patent describes a valve for a zoned inflatable cushion such that access to all of the zones is cut off simultaneously because the valve is in a flap which is part of the cushion base and all of the access channels run through the flap. U.S. Pat. No. 5,502,855 utilizes a series of hoses to inflate the cushion and gathers the ends of the hoses in close proximity adjacent one edge of the cushion to prevent tangling. The cushion of the '855 patent also provides access to the cushion zones from beneath the cushion and provides access to each cell so as to be able to monitor from remote locations.

The present invention is an improvement on valves required by zoned cellular cushions. Heretofore, the zoned cushions employed integral channels which lead from the several zones and which are connected through an integral common manifold and associated valve. The valve generally comprises a flap that is folded over to seal off the ends of the channels or opened to allow communication between the zones through a manifold contained within the flap. Through use it has been determined that these flap-type valves and other prior art zoned cushion valves suffer from some drawbacks. First, in the flap-type valve, the flap has to be manually folded closed and secured with a snap or the like. Often these types of apparatus are difficult for a disabled individual to manipulate. The flap can be awkwardly positioned under the cushion.

A more urgent concern is that the flap valve possibly could leak or fail if the ends of the channels are not appropriately sealed. Continued use and normal wear over time may impair the effectiveness of the flap-type valve. Leaking through the valve could result in unwanted communication between the zones or, in the worst case, could result in loss of air from the cushion and a phenomenon known as "bottoming out" where the user's buttocks come to rest on an uncushioned surface. If the user has no sensation or feeling in the buttocks, for example, the user could "bottom out" and not be aware.

SUMMARY OF THE INVENTION

The present invention, when employed for example with a zoned cushion having a plurality of inflation zones, provides an easily manipulated valve assembly which can be used to allow fluid communication between two or more zones or can be used to isolate the zones.

In one aspect of the invention, the valve includes a casing having an internal bore and a plurality of openings along the length of the casing which open into the bore. The openings are connected to the individual inflation zones via tubing or the like to place the bore of the casing in communication with the inflation zones. The valve also includes a movable slide seated snugly within the casing bore. The slide has a longitudinal internal bore and a number of openings along its length that communicate with the slide bore. Generally the number of openings in the slide is the same as the number of openings in the valve casing. The slide can be manipulated to align the slide openings with the casing openings to allow the inflation zones to communicate and the air to flow to and from the various inflation zones through the valve slide bore. Correspondingly, the slide can be manipulated to move the slide openings and the casing openings out of alignment, thereby sealing off the inflation zones.

The casing and slide can be cylindrical, ovoid or rectangular in cross section. In one preferred embodiment the slide can be manipulated from side-to-side to move the respective openings into and out of registry. In another exemplary embodiment, the slide is cylindrical in cross section and can be rotated about its longitudinal axis within the casing to move the openings into and out of registry. In another exemplary embodiment, the casing and slide have a circular configuration. In any event, the slide and casing arrangement can include a detent to secure the slide in the desired position. Further, the slide can be color-coded to provide visual indication that the slide is in the desired position.

In another exemplary embodiment, the slide has an air inflation apparatus on one end that can be connected to an air source. Individual zones of the cushion can be inflated simultaneously by introducing air through the valve slide positioned in an open position.

The valve assembly of the present invention can be manufactured apart from the rest of the cushion and appropriately attached to the cushion.

BRIEF DESCRIPTION OF THE SEVERAL VIEWS OF THE DRAWINGS

The various aspects of the invention are achieved as set forth in the illustrative embodiments shown in the drawings, which form a part of the specification.

Corresponding reference numerals refer to corresponding elements of the invention throughout the accompanying drawings.

DESCRIPTION OF THE PREFERRED EMBODIMENT

Referring now to the drawings (FIGS. 1–4), the letter A designates one exemplary embodiment of a cellular cushion which is highly flexible and is designed for use on an underlying supporting surface, such as the seat of a wheelchair, the seat of a vehicle or the seat of a conventional chair. Being cellular, cushion A distributes the weight of its occupant generally uniformly over the entire area of the buttocks and thereby dissipates the pressures resulting from the supported weight of the ischia, that is, the bony prominence of the buttocks. It further has the capacity to position and stabilize the user. It will be appreciated that although the present invention is described as employed on a cushion, the novel valve assembly can also be employed with an air mattress or air mattress section or other similar devices that include inflatable zones.

Figure 1:
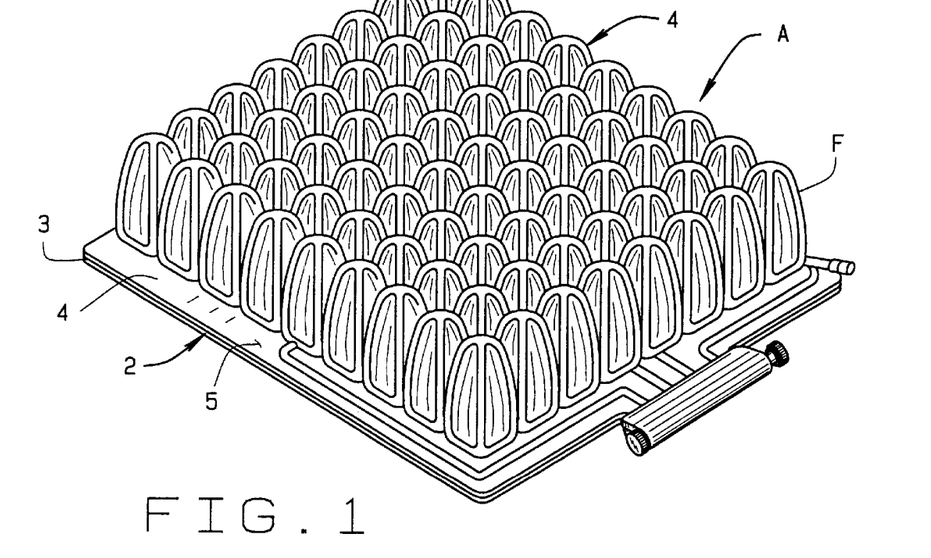
FIG. 1 is a top perspective view of a cushion employing a novel cushion valve of the present invention.

The cushion A includes a base 2 and air cells 4 that project upwardly from the base 2. Generally the air cells 4 are molded as a conformal having a web 5 interconnecting the cells 4. The base is comprised of the web and a backing 3. Both the backing 3 and the air cells 4 preferably can be molded or otherwise formed from a highly flexible neoprene. The cells 4 and web 5 may be formed over a mandrel in a dipping operation as described in U.S. Pat. No. 4,541,136. On the other hand, the air cells 4 can be molded from a highly flexible neoprene and the base 2 can be vacuum formed of the web and a backing formed from polyurethane, for example, and appropriately attached to the conformal.

The base 2 generally is rectangular and the cells 4 are arranged on it in longitudinal and transverse rows, with each cell occupying both a longitudinal and a transverse row. It will be appreciated that although the illustrated embodiment provides for individual cells each having a configuration consisting of four fins F, the configuration of the individual cells is incidental to the invention. The present invention can be used with a cushion employing any preferred configuration of cells 4, that is, for example, cells having any number of fins or sides, cells having no fins, for example, cylindrical, cubical cells or rounded cells.

Figure 2:
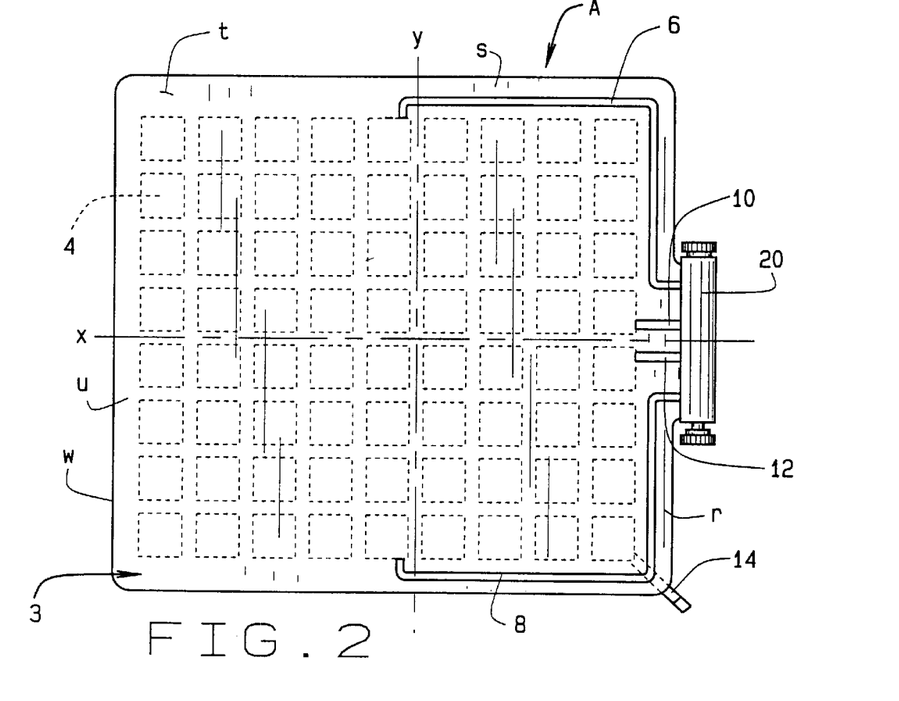
FIG. 2 is a bottom plan view of the cushion and cushion valve shown in FIG. 1.

The cells 4 are further arranged in zones, typically four zones r, s, t and u. The zones r and s lie side by side at the front of the cushion A and the zones t and u exist side by side at the rear of the cushion A. The right zones r and u are separated from the left zones s and t along a longitudinal axis x, whereas the front zones r and s are separated from the rear zones t and u along a transverse axis y. More or fewer zones and differing arrangements of those zones may be employed.

Within the base 2 the cells 4 of the zone r communicate with each other, so that all exist at the same general internal pressure irrespective of how far any individual cell is depressed. The same holds true with regard to the cells 4 of the zone s, the cells 4 of the zone t, and the cells 4 of the zone u. In other words, the cells 4 of zone r are normally isolated from the cells of the remaining zones s, t and u. Likewise, the cells 4 of the zone s are normally isolated as are the cells 4 of zones r, t and u and so forth. Thus, the cells 4 of each zone r, s, t and u collectively define a separate inflation zone or compartment.

A fluid conduit 6 extends from zone t toward the front of the cushion. Likewise a fluid conduit 8 extends from zone u to the front of the cushion. Two shorter conduits 10 and 12 extend from zones s and r respectively toward the front of the cushion. The conduits 6, 8, 10 and 12 all terminate near an edge of the cushion and are in fluid communication with the cushion valve of the present invention, as will be explained in detail below. It also will be appreciated that the various conduits can be formed in any appropriate manner without departing from the scope of the invention. For example, the conduits can be formed integrally in the base 2 when the base is molded or vacuum formed.

The illustrated embodiment is one acceptable configuration of conduits. The conduits can be formed in any acceptable manner that results in access to the conduits at one location on the periphery of the cushion so that valve of the present invention can be utilized. By way of example, the conduits can be formed into the web 5 or can comprise separate tubing without departing from the scope of the invention. An air filling valve 14 is located at zone r that is opened and closed simply by turning its end. It will be appreciated, however, that the air fill valve can be located at any desirable and convenient location on the cushion.

The conduits 6, 8, 10 and 12 are operatively connected to a novel valve 20, which is one primary aspect of the present invention. As will be explained in detail hereinafter, when closed, the valve 20 isolates the cells 4 of the several zones r,s,t and u. But when opened, it interconnects the zones r, s, t, and u, so that the interiors of all the cells 4 in all zones are in communication and, therefore, all exist at the same internal pressure. The air filling valve 14 enables air to be pumped into the cells 4 of the zone in which it is located and, when the valve 20 is open, the air inflates the cells 4 of all of the zones r, s, t and u. Use of only one air-filling valve 14 insures all of the cells 4 in the zones r, s, t, and u will be at the same initial pressure, even though the volume of air in the cells or zones may vary in use.

One embodiment of the novel valve 20 will now be described in greater detail with particular reference being paid to FIGS. 3–13. In the illustrated embodiment of the cushion there are four air conduits 6, 8, 10 and 12 which are in fluid connection with the four zones r, s, t and u respectively. This is accomplished by having a first end of each conduit terminate in a cell 4 of one zone. The opposite or second end of the conduit is in fluid connection with valve 20, as shown. In the exemplary embodiment of FIGS. 3–5, the valve 20 includes a casing 22 with a longitudinal inner bore 24. The bore 24 of the illustrated embodiment has a circular cross section, but could be ovoid, rectangular, triangular or any other cross-sectional configuration, as can be the casing and the slide itself. The casing 22 also includes a series of open-ended channels 26, 28, 30 and 32 which are perpendicular to, and open into, bore 24. The open-ended channels are dimensioned to securely and snugly seat adjacent the second ends of the conduits (see FIG. 6).

Figure 3:
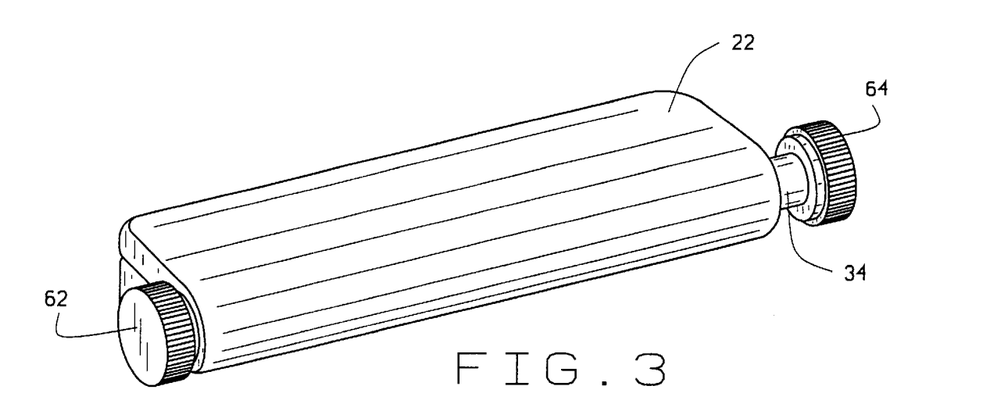
FIG. 3 is an enlarged perspective view of one embodiment of a novel cushion valve of the present invention.
Figure 4:
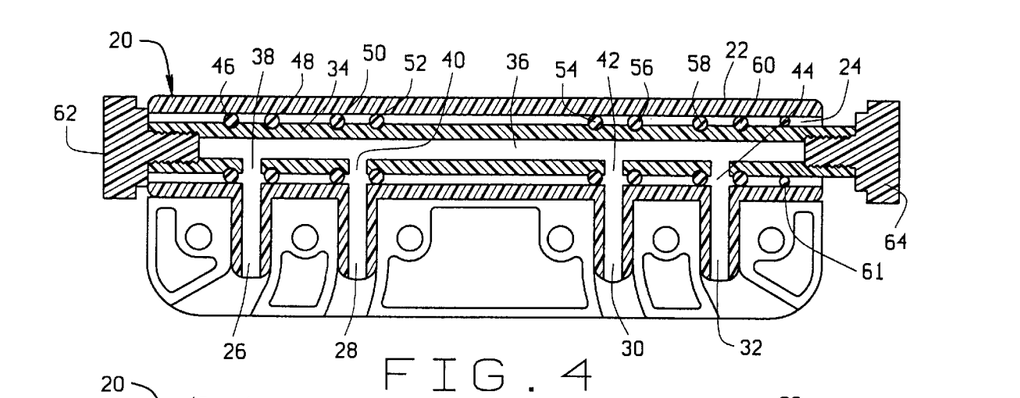
FIG. 4 is a cross-section of the novel cushion valve of FIG. 3, the valve being in an open position.
Figure 5:
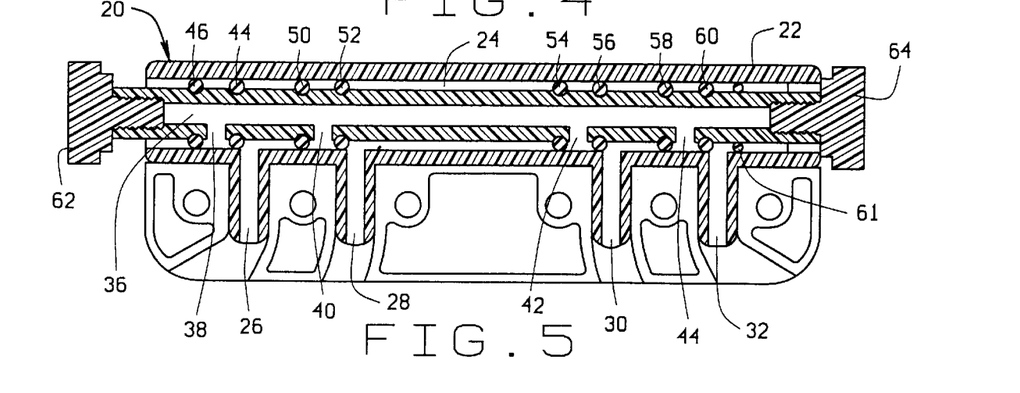
FIG. 5 is a cross-section of the novel cushion valve of FIG. 3, the valve being in an closed position.

The channels 26, 28, 30 and 32 are positioned along the length of the bore 24 at predetermined intervals. The second ends of the conduits can be pressure fit into the channels, glued or otherwise secured within the channels. Valve 20 also includes a slide 34, which is movably engaged in bore 24. As shown, slide 34 also has a cylindrical cross section (or any other cross section complementary to the cross section of casing bore 24) and has a diameter slightly less than the diameter of bore 24 so that slide 34 can move axially within bore 24. Slide 34 has an inner bore 36, which extends the axial length of the slide.

Slide 34 has as series of short channels or openings 38, 40, 42 and 44 which open into, and are in fluid communication with, inner bore 36. The openings 38, 40, 42 and 44 are positioned along the length of bore 36 at predetermined intervals with the spacing between the openings corresponding to the spacing between the channels 26, 28, 30 and 32, respectively, of the casing 22. In the illustrated embodiment, "O" ring seals 46, 48, 50, 52, 54, 56, 58, 60 and 61 are position on each side of the respective slide openings to make a fluid or air tight seal around the openings. The slide 34 is plugged at each end with plugs 62 and 64. Plugs 62 and 64 not only plug or seal the ends of bore 36, but also provide a convenient and ergonomically satisfying structure for the user to grasp or touch to manipulate the slide 34, and also operate as stops when the slide is manipulated within the casing bore, as will now be explained.

As explained above, when closed, the valve 20 isolates the cells 4 of the several zones r, s, t and u. But when opened, valve 20 interconnects the zones r, s, t, and u, so that the interiors of all the cells 4 in all zones are in communication and, therefore, all exist at the same internal pressure. FIG. 4 shows valve 20 in an open position. To achieve the open position, the user moves or shifts slide 34 until plug 62 abuts the casing so that its openings 38, 40, 42 and 44 are aligned, and in registry with, openings 26, 28, 30 and 32, respectively, of the casing. In the open position, the respective inflation zones are in fluid communication with each other via conduits 6, 8, 10 and 12 through bore 36 of the slide. FIG. 5 illustrates valve 20 in a closed position. The user moves slide 34 in the opposite direction until plug 64 abuts casing 22. The openings of the slide are out of alignment with the openings of the casing thereby sealing off the ends of conduits 6, 8, 10 and 12.

Figure 6:
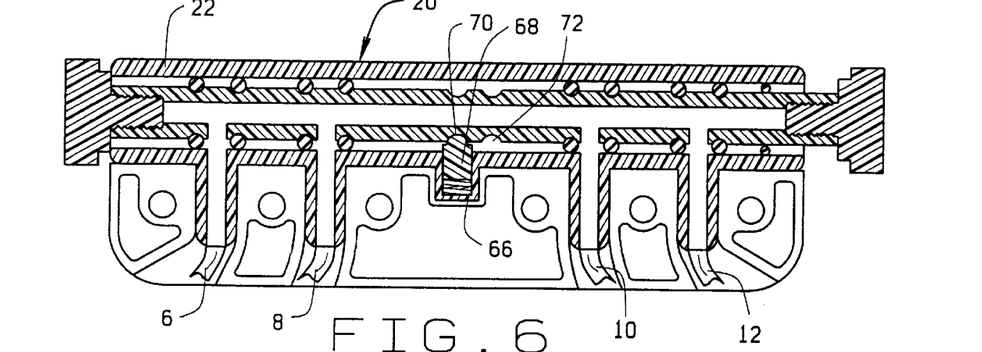
FIG. 6 is a cross-section of another embodiment of the novel cushion valve of FIG. 3, the valve being in an open position.
Figure 7:
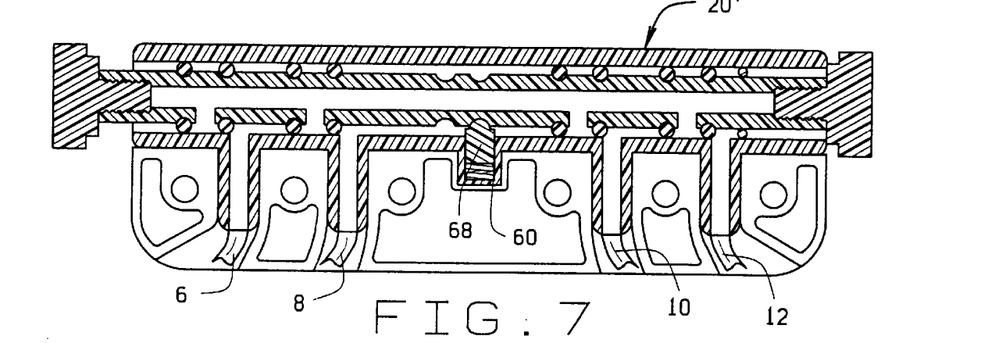
FIG. 7 is a cross-section of the novel cushion valve of FIG. 6, the valve being in an closed position.

FIGS. 6 and 7 illustrate another exemplary embodiment of the valve 20, indicated generally as valve 20'. Valve 20' comprises the functional parts of valve 20. However, the interior of casing 22 includes a small lateral orifice 66 which opens into bore 24. A spring-biased rounded detent 68 is seated in orifice 66. Slide 34 includes a first circumferential groove 70 and a second circumferential groove 72. When the slide 34 is in a first or open position (FIG. 6) the detent 68 is biased into groove 70. When the slide is moved to a second or closed position (FIG. 7), the detent is biased into groove 72. This arrangement serves to important functions: first, combination of the detent and grooves secures the slide in the desired position and, secondly, the audible and/or palpable "click" of the detent into the groove allows the user to be reasonably certain that the slide 34 is in its desired position.

Figure 8:
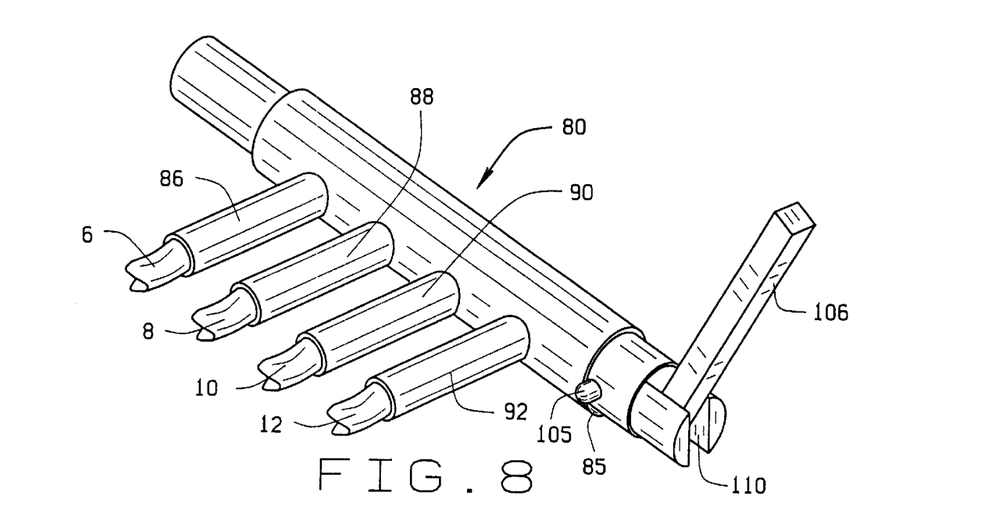
FIG. 8 is an enlarged perspective view of another representative embodiment of the novel cushion valve of the present invention.
Figure 9:
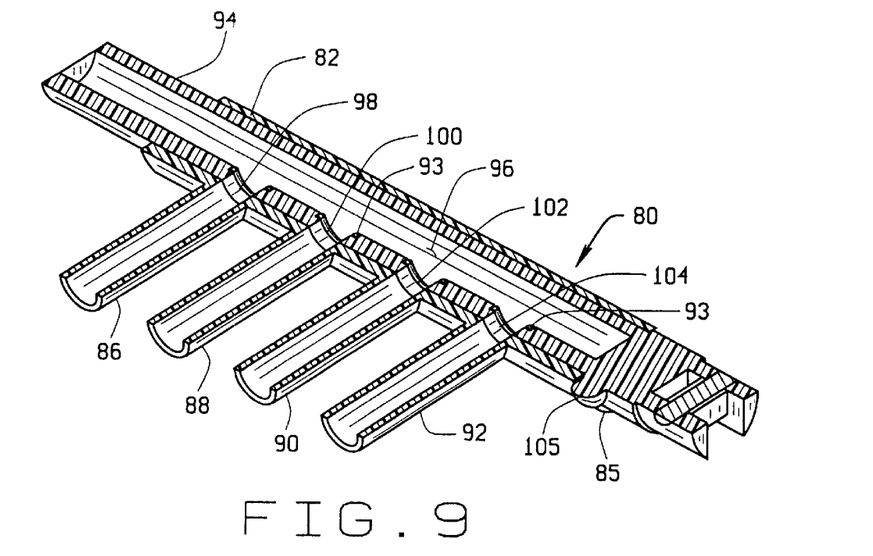
FIG. 9 is a cross-sectional view of the novel cushion valve of FIG. 8, the valve being in an open position.
Figure 10:
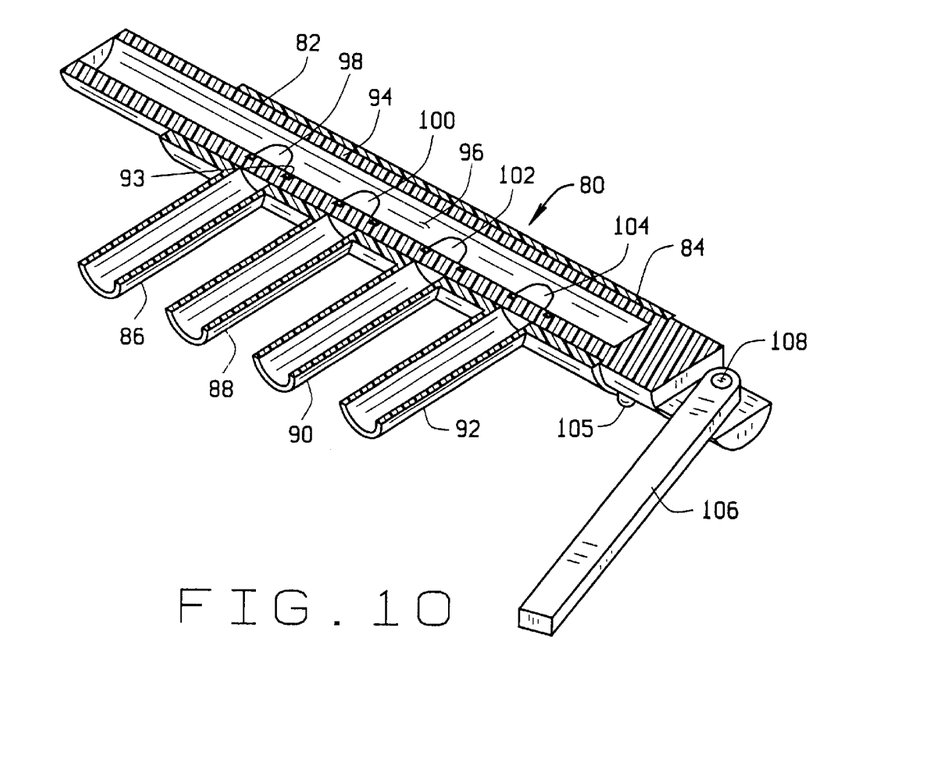
FIG. 10 is a cross-sectional view of the novel cushion valve of FIG. 8, the valve being in a closed position.

FIGS. 8 through 10 illustrate another exemplary embodiment of a valve of the present invention, indicated generally by reference numeral 80. Valve 80 includes a casing 82 having cylindrically shaped longitudinal inner bore 84. As illustrated, casing 82 is cylindrical in cross section, but that is not mandatory. It is required, however, in this particularly embodiment, that the bore 84 be substantially cylindrical. The casing is notched, as at 85. There are a series of tubular connectors 86, 88, 90, 92 spaced along the length of casing 82. There are ring seals 93 at the juncture of the connectors and bore 84. It will be appreciated that the respective tubular connectors are open ended. The conduits 6, 8, 10 and 12 are secured in the first or free open end of the connectors, as shown in FIG. 8. The second open end of each tubular connector opens into, and is in fluid cooperation with, bore 84 of the casing.

A slide 94 is rotatably seated in bore 84. As will be appreciated, slide 94 has a substantially cylindrical cross section and is seated snugly within bore 84. The slide does not move axially in this bore. Slide 94 includes a closed ended, longitudinal inner bore 96. There are a series of openings 98, 100, 102 and 104 spaced along the length of slide 94. As will be appreciated, openings 98, 100, 102 and 104 are positioned adjacent to connectors 86, 88, 90 and 92, respectively. There is a detent knob 105 on the outer surface of slide 94 and is position in the notch 85. Slide 94 includes a handle 106 at one end. As illustrated, handle 106 is attached to a pivot 108 within gap 110 formed in one end of the slide. The handle also can be of any useful structure and is not limited to the pivotable handle 106. For example, a knob, a wheel, a lever or any other apparatus for rotating the slide may be used.

As shown in FIG. 9, the user can grasp handle and rotate the slide 94 about its longitudinal axis within bore 84 so that the openings 98, 100, 102 and 104 are in registry with the connectors 86, 88, 90 and 92, respectively, thereby opening valve 80. The detent knob 105 will abut the notch 85 edge so that it is not rotated too far to take the openings and connectors out of alignment. As shown in FIG. 10, the slide 94 can be rotated within bore 84 so that the openings 98, 100, 102 and 104 are rotated out of registry with the connectors, thereby allowing the slide to seal off the connectors to close the valve. In the closed position the detent knob 105 will abut the other side of notch 85. The user can be assured that rotating to this stop position closes the valve.

Figure 11:
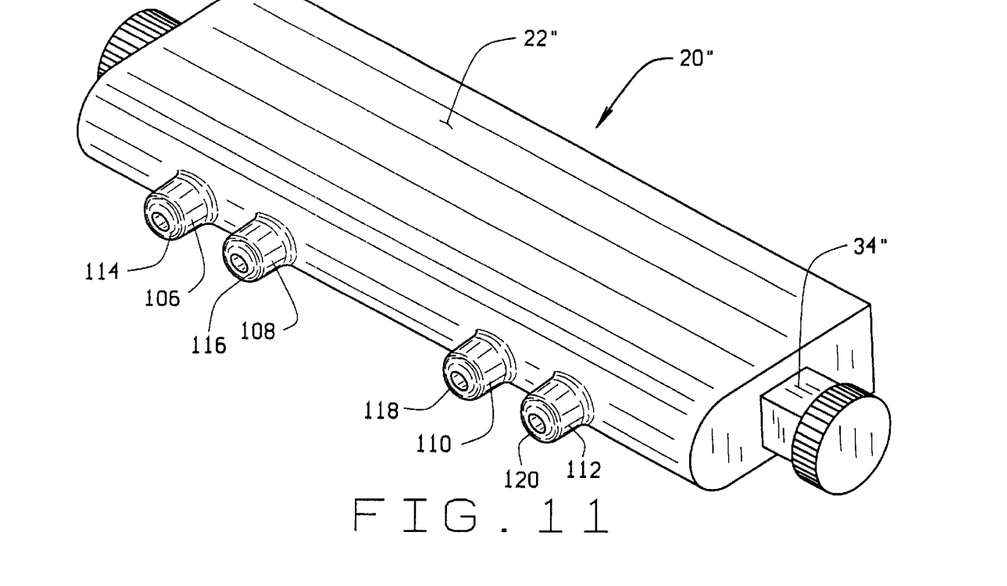
FIG. 11 is an enlarged perspective view of another representative embodiment of the novel cushion valve of the present invention.
Figure 12:
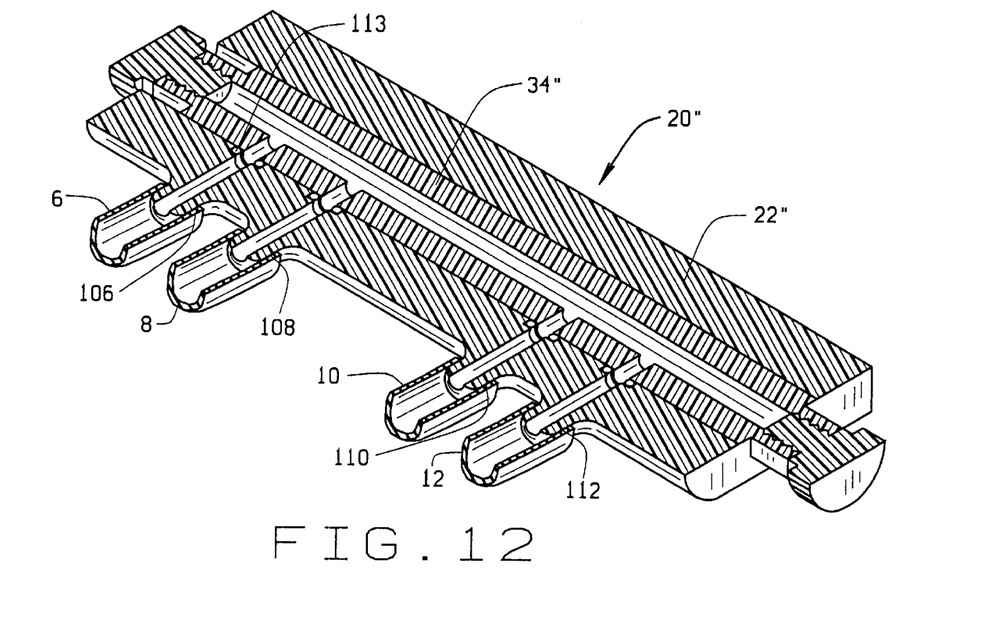
FIG. 12 is a cross-sectional view thereof, the valve being in an open position.

FIGS. 11 and 12 illustrate yet another illustrative embodiment of valve 20 (FIGS. 3–5), indicated generally by reference numeral 20". It will be appreciated that valve 20" operates in the same manner as does valve 20 and also may include the detent/groove apparatus of valve 20'. The casing 22" of valve 20, however, has flatter profile. It will be noted that casing 22" includes short open-ended connectors or nipples 106, 108, 110 and 112 for the connection of conduits 6, 8, 10 and 12, respectively. The slide 34" seats within the casing bore in a much tighter fit, that is, there is very little clearance between slide 34" and the walls of the casing inner bore. This relatively tight friction may eliminate the need for O-ring seals on each side of the slide openings. However, in the illustrated embodiment, seals, such as seal 113, are included. Also, as can be seen, the connectors 106, 108, 110 and 112 have rounded external ends 114, 116, 118 and 120, respectively, which allows them to be introduced into the open ends of the conduits 6, 8, 10 and 12, as shown in FIG. 12.

Figure 13:
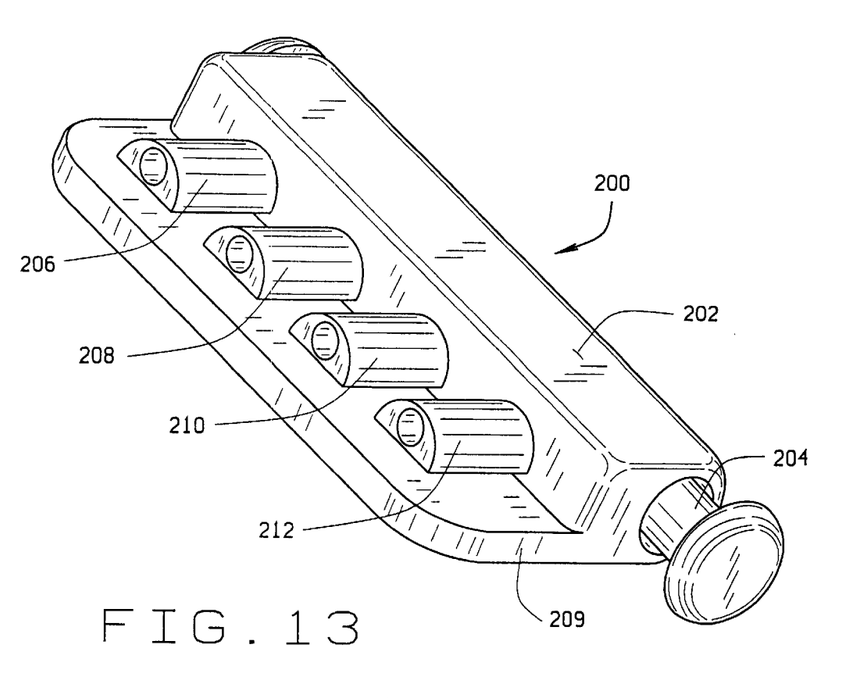
FIG. 13 is an enlarged perspective view of another representative embodiment of the novel cushion valve of the present invention.

FIG. 13 illustrates another exemplary embodiment of valve 20, indicated generally by reference numeral 200. Valve 200 functions in the same manner valve 20 and also may include the internal detent/groove apparatus of valve 20'. Valve 200 includes a low profile casing 202. Casing 202 has an inner bore (not shown), as illustrated with regard to the other embodiments. A slide 204 is slidingly engaged within the casing bore and is constructed and function in the same manner as previously described with regard to valves 20, 20' and 20". Casing 202 has a flat base extension 204. A series of conduit connectors 206, 208, 210 and 212 are positioned along the base extension 204. The conduit connectors function in the same manner as conduit connectors previously described.

Figure 14:
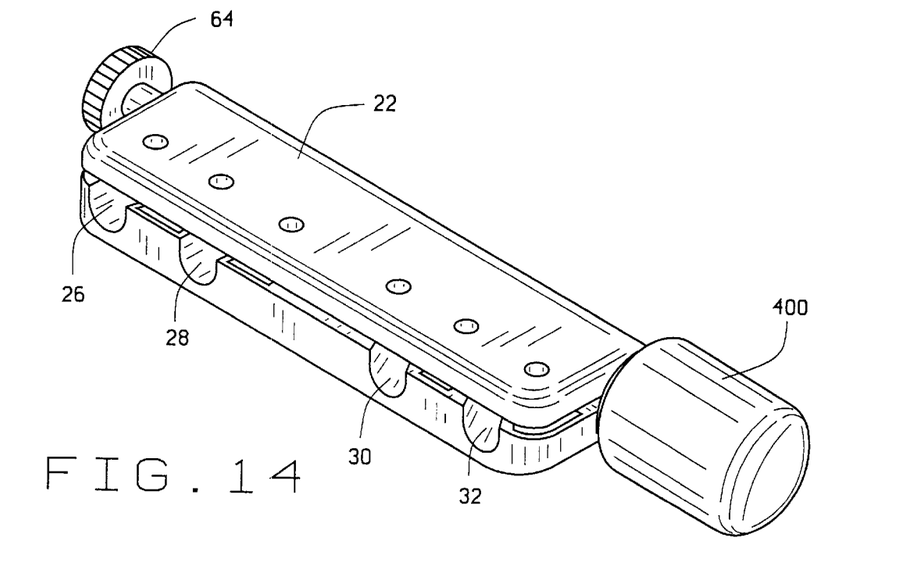
FIG. 14 is an enlarged perspective view of a valve, as shown in FIG. 3, including a servo slide actuator.

It will be appreciated that components of the various embodiments of the novel valve can be molded from, or formed or constructed from, any appropriate material such as polyethylene, lightweight durable metal or the like. Moreover, it also would be possible to construct the valve so that the slide is solenoid or servo activated to avoid hand manipulation. One such illustrative embodiment is shown in FIG. 14. A servo actuator 400 is connected to the slide. One type of actuator is a double acting coil. When one coil is energized, the spool is shuttled in one direction, for example to open the valve. When the other coil is energized, the spool is shuttled in the opposite direction. The servo can be energized by any appropriate means known to the art including battery power.

The illustrated valves are constructed to communicate with four conduits in a cushion having four inflation zones. It also will be appreciated, however, that the novel cushion valve can include any number of channels in order to function with cushions that have a greater or lesser number of individual inflation zones. For example, if the cushion had only two zones, the valve would be configured to accommodate two conduits. This can be accomplished by forming the valve with only two channels or by plugging two unused channels of a four channel valve. Furthermore, for example, if the valve is used with a cushion having six individual inflation zones, the valve would include six channels for connection to the conduits.

Operation

In order to prepare the cushion A for the user, the valve 20, 22' 22" or 80 is opened as shown in FIGS. 4, 6, 9, or 12. Opening the valve opens the conduits 6, 8, 10 and 12 and thereby allows the conduits to be in fluid communication with the bore of the valve slide which places the four zones r, s, t and u in communication through the valve slide bore. The air filling valve 14 is opened and air is pumped into it with a pump which connects to the valve 14. The air initially flows into the cells of zone r, but since the cells of the remaining zones s, t and u are in communication with the cells of zone r through the open valve, all of the cells 4 are inflated and the cells 4 reach a state of equilibrium. Enough air is pumped into the cushion A to exceed the requirements for supporting the user. The valve 14 then is closed and the pump removed.

Next the over-inflated cushion A is place on the supporting surface upon which it is to rest when supporting a user. The user then sits upon the cushion A in the location he or she expects to assume and slowly releases air from the air filling valve 14 to immerse the user. As air is released, the user's buttocks sink deeper and deeper into the array of cells 4, and they tend to envelop and assume the contour of the buttocks. Enough air is released to bring the region of the ischia to within about ½ inch of the base 2. Of course, as air flows out of the cushion A all of the cells 4 remain at essentially the same internal pressure because they are interconnected through the open valve. When the user achieves the desired immersion, the air filling valve 14 is closed.

While immersed in the cells of the cushion A, the user moves, or is moved by others, to the posture desired to be maintained for an extended period and this causes a redistribution of air amongst the cells 4 of the several zones r, s, t and u. In time, the cells 4 of the several zones r, s, t and u reach equilibrium, that is to say, the flow between the zone r, s, t and u ceases. At this time the valve slide is manipulated to a closed configuration. (FIGS. 5, 7, 10), thereby preventing air flow through the slide bore and thus isolating the zones r, s, t, and u.

The isolated zones r, s, t and u impart stability to the cushion A, and this serves to maintain the user in the selected posture. Thus, as the user attempts to assume a different posture, he or she will encounter greater resistance from cells 4 of one or more of the zones r, s, t and u, and they will urge the user back to the initial posture. The capacity to maintain a selected posture is particularly useful with users who suffer from spinal deformities and for those whose muscles have atrophied.

Figure 15:
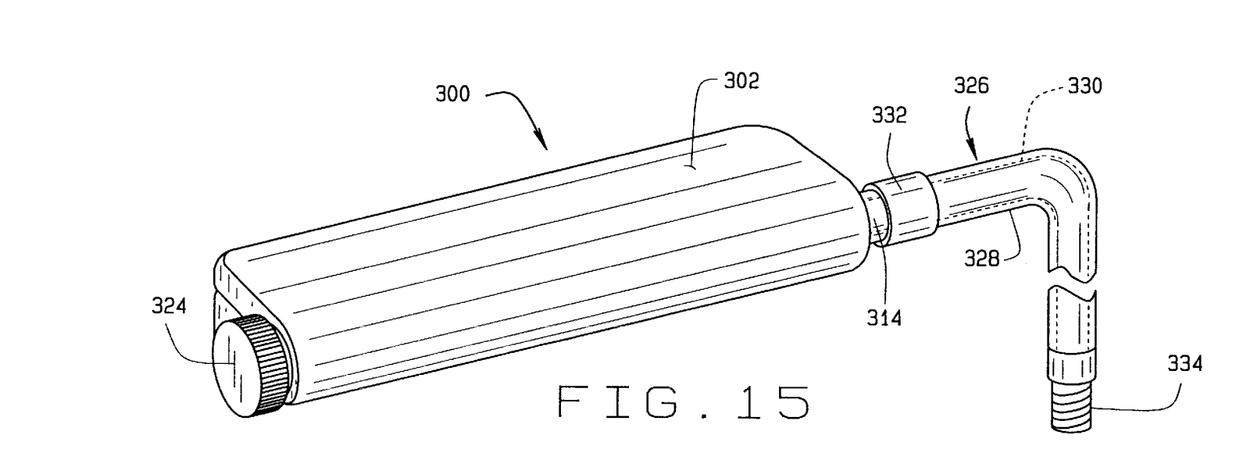
FIG. 15 is perspective view of an exemplary embodiment of the novel cushion valve having an air inflation apparatus at one end.
Figure 16:
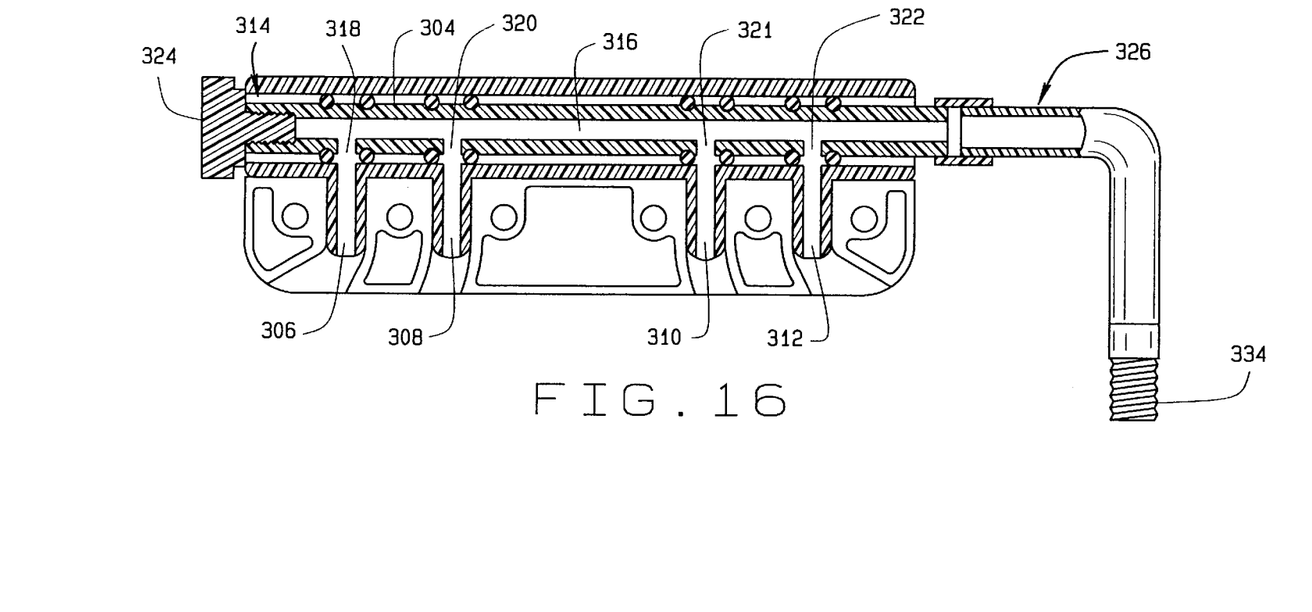
FIG. 16 is a cross-sectional view of the exemplary cushion valve of FIG. 15.

FIGS. 15 and 16 illustrate an exemplary embodiment of the novel valve of the present invention, indicated generally by reference numeral 300 designed to allow inflation of zones r,s,t and u through the valve slide. As shown, the valve 300 is constructed similarly to the valve illustrated in FIGS. 3 and 4 and has a casing 302 with an inner bore 304. The casing includes the open-ended channels 306, 308, 310 and 312 which open into bore 304. A slide 314 with inner bore 316 is movably positioned within bore 304. Slide 314 has a series of short channels 318, 320, 321 and 322 which communicate with bore 316. The slide functions to equalize pressure within the four zones r,s,t and u as previously described. However, slide 314 has a plug 324 at one end and an inflation apparatus 326 at the other end. In the illustrated embodiment, the inflation apparatus 326 comprises tubing 328 having an inner bore 330, a fitting 332 at one end to connect the hose to the slide and a conventional filling valve 334 at the opposite end. Tubing bore 330 is in fluid communication with bore 316. As can be appreciated, valve 334 is attached to an air source, (not shown) such as a pump or air tank to provide airflow through the tubing, the slide channel and the respective conduits to inflate the cushion to a desired initial pressure. The inflation apparatus 326 provides easier access for inflation when the cushion is used as a conventional wheelchair cushion.

Another illustrative use of the inflation apparatus with the valve is in an inflatable seat cushion employed in a vehicle, such as a truck. The apparatus can be connected to an air source in the truck. Valve 300 is opened by manipulating slide 314 so that the air from the air source flows into the four zones r,s,t and u substantially simultaneously to inflate the cushion. When the cushion is appropriately inflated and the user positioned, valve 300 is closed. Apparatus 326 can be removed from the air source and filling valve 334 closed, if desired.

It will be appreciated that a filling valve 334 can be attached directly to the slide if the tubing is not desired. Also, an inflation apparatus can be employed with any of the previously described valve embodiments. It is described in use with valve 300 for purposes of clarity and brevity. Likewise, inflation apparatus 326 is one exemplary embodiment of an inflation apparatus and the term inflation apparatus as used herein and in the appended claims, is intended to encompass any apparatus that can be associated with the slide bore to allow inflation of the zones r,s,t and u through the valve.

Figure 17:
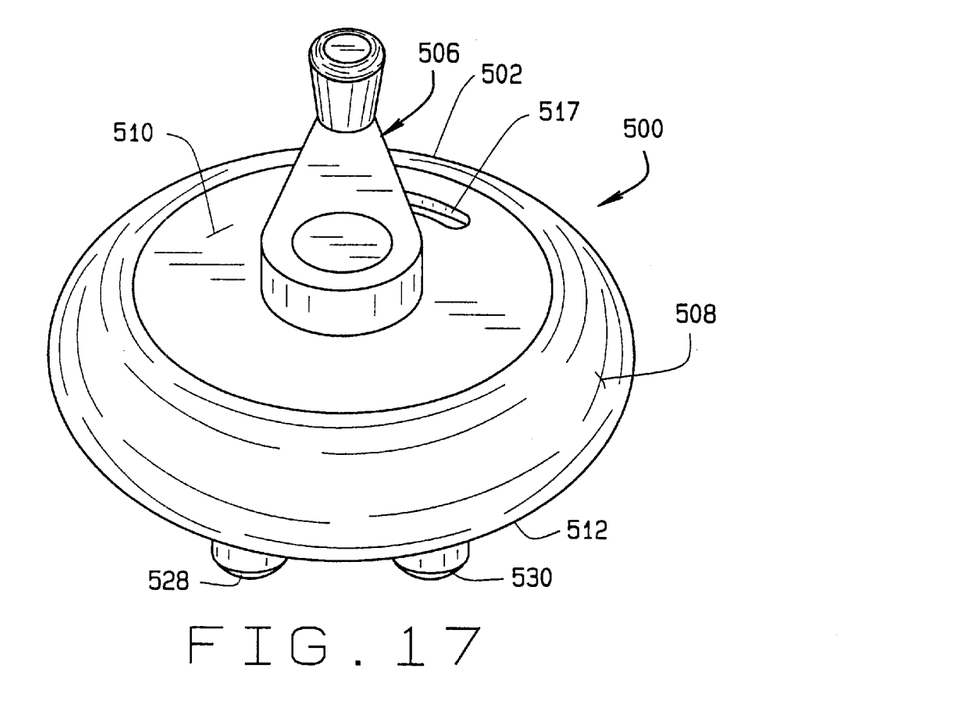
FIG. 17 is a perspective view of another exemplary embodiment of a valve of the present invention.

Another exemplary embodiment of a valve of the present invention is indicated generally by reference numeral 500 in FIG. 17 and functions with the inflatable apparatus in the same manner described above with reference to the other exemplary embodiments. Valve 500 has a round, somewhat flat configuration and comprises a casing 502, a slide 504 within the housing (FIG. 19) and an actuator 506 operatively connected to the slide. Housing 502 is shown in greater detail in FIG. 18. Casing 502 has a substantially round or disk-like configuration and includes a circumferential wall 508, a top wall 510 and a bottom wall 512. The recited walls define a circular inner chamber 514. There is an opening or hole 516 through the top wall. There also is a shallow arcuate detent groove 517 in the top wall.

Figure 18:
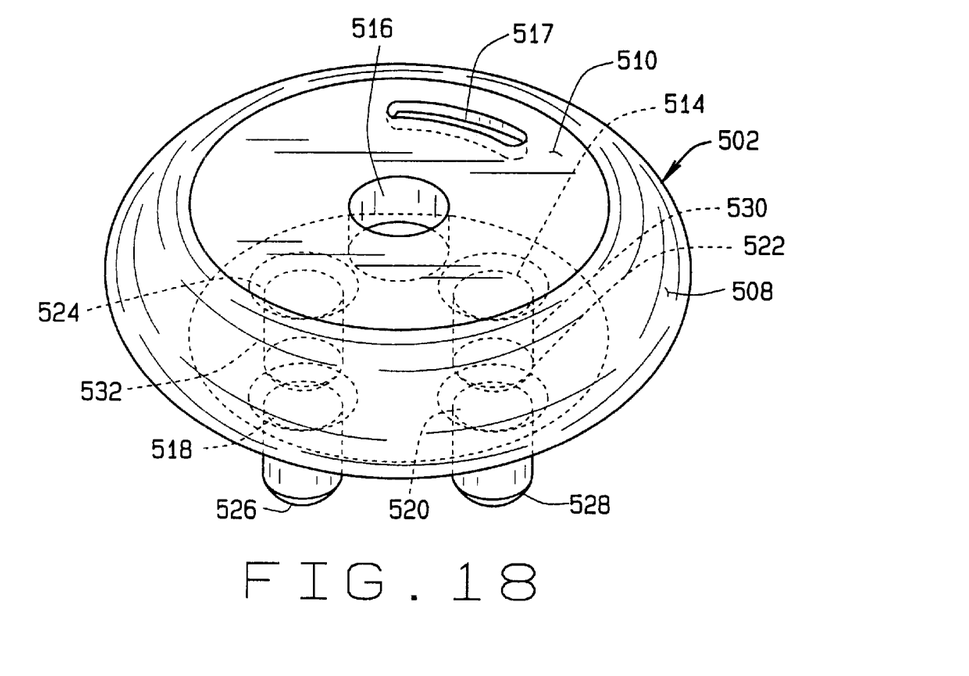
FIG. 18 is a perspective view of the housing of the valve of FIG. 17.

The bottom wall 512 includes four evenly spaced apart openings or holes 518, 520, 522 and 524 that are in fluid communication with chamber 514. In the illustrated embodiment, the openings 518, 520, 522 and 524 include short tubular extensions 526, 528, 530 and 532 respectively. The tubular extensions are connected to the cushion conduits in a manner similar to that described above. The housing could be fabricated without the extensions and the conduits connected directly to the openings in the bottom wall.

Figure 19:
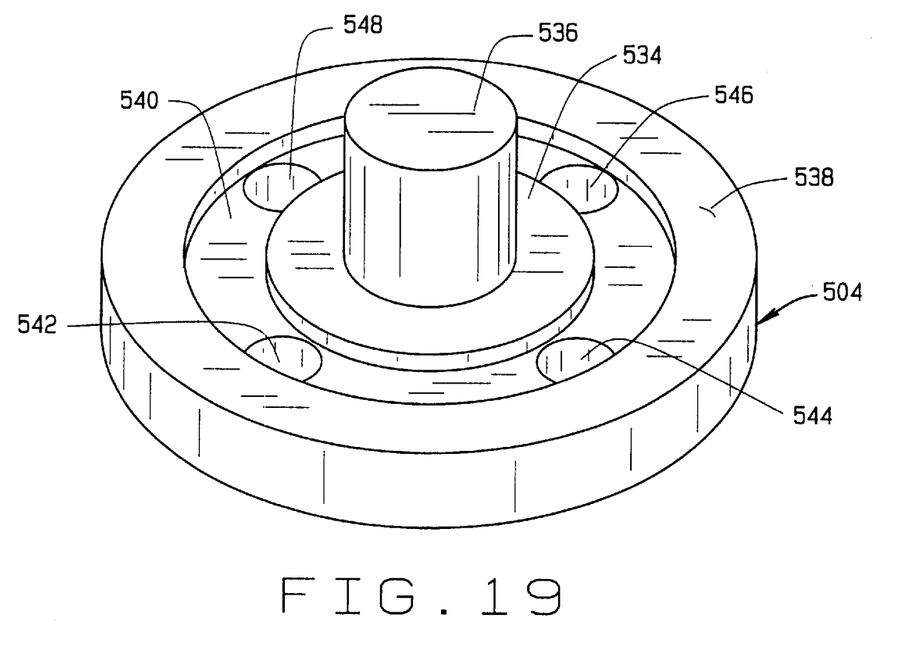
FIG. 19 is a perspective view of the slide of the valve of FIG. 17.

Slide 504, seen best in FIG. 19, is rotatably seated in chamber 514. Slide 504 has a circular or disc-like configuration and is sized to seat within chamber 514. Slide 504 has a concentric hub 534 with a protruding actuator shaft 536. Shaft 536 fits through hole 516 in the top wall of the housing and can be appropriately sealed if required. Slide 504 has a peripheral margin 538 with an annular depression or groove 540 formed between the margin and the hub. There are four equally spaced apart holes 542, 544, 546 and 548 formed through the slide in groove 540.

Figure 20:
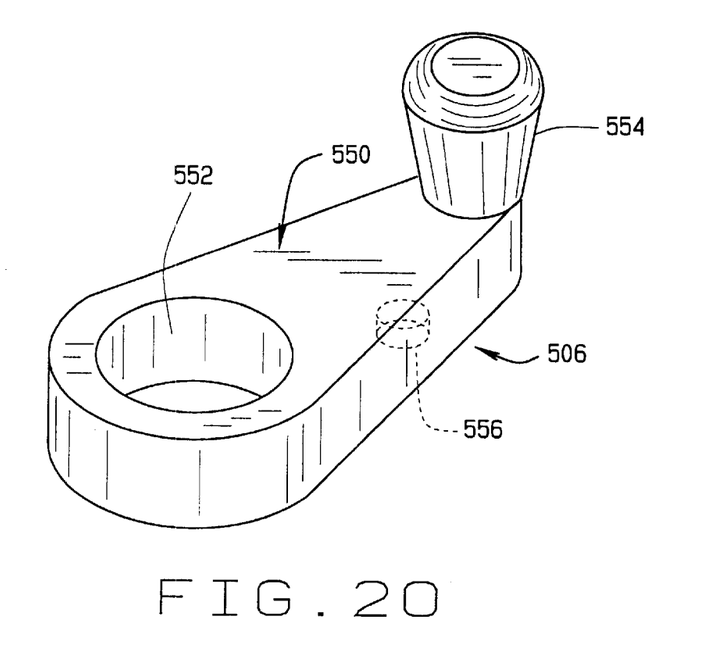
FIG. 20 is an actuator.

Actuator 506, best seen in FIG. 20, includes an arm 550 having a hole 552 through a first end and a handle 554 extending up from the top surface of the second end. Hole 552 is dimensioned to mount on stem 536. There is a detent 556 on the bottom surface of arm 550 adjacent handle 554. The detent is positioned to engage groove 517. Actuator 506 is one exemplary embodiment of an apparatus used to effect movement of the slide within the casing. The term actuator as used herein is intended to include any apparatus or element which can effect movement of the slide within the casing.

Figure 21:
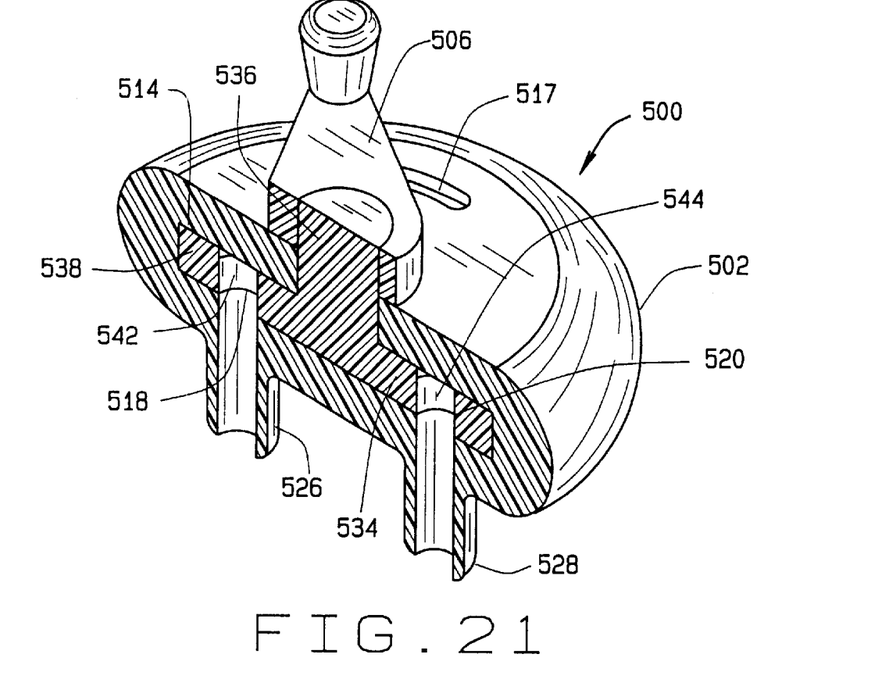
FIG. 21 is a cross-sectional view of the valve of FIG. 17 in an open position.
Figure 22:
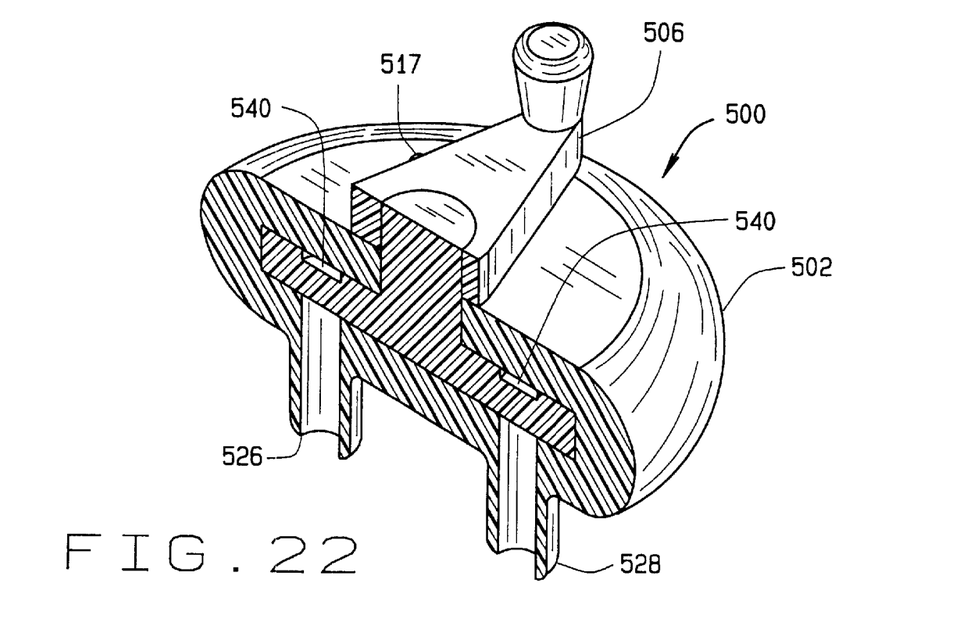
FIG. 22 is a cross-sectional view thereof, the valve being in a closed position.

FIG. 21 illustrates valve 500 in an open position in which there is fluid communication among all four zones of the cushion. In this first position holes 542, 544, 546 and 548 are in alignment or registry with holes 518, 520, 522 and 524 in the housing. The zones of the cushion are in communication through annular groove 540. When the actuator and, consequently slide 504, is moved to the opposite direction, as shown in FIG. 22, the recited holes are moved out of alignment and communication among the zones is blocked. Detent 556 abuts one end of the detent groove 517 when the valve is opened and abuts the opposite end of the detent groove when the valve is fully closed, allowing the user to determine when the valve is open or closed.

It will be appreciated by one skilled in the art that an inflation apparatus also could be attached to valve 500 to allow inflation of all four zones of the cushion as described in detail above. Also, valve 500 can have an appropriate detent structure associated with the actuator, the slide or the casing to secure the slide in place.

While cushion A and the novel valve are designed for seat cushions, they may be expanded in use and, as previously discussed, configured differently in the arrangement of the zones or the number of zones. Further, the same inventive principles can be applied to inflatable mattress, auto, truck, bicycle or motorcycle seat cushions or any other type of air cushioned seating or resting surface. Consequently, the term "cushion" as used in the appended claims is intended to include any such seating apparatus, regardless of configuration or application. Moreover, the novel valve may be employed in any air inflated device, other than cushions, which is divided in to air chambers or zones.

The foregoing description and the accompanying drawings are intended to be illustrative of the best mode of working the invention presently known to the inventors and should not be construed in a limiting sense.

What is claimed is:

1. A valve assembly for use with an inflatable apparatus having a plurality of individual inflation zones comprising:
    a casing having a cylindrical casing wall defining an inner longitudinal bore, said wall having a plurality of linearly aligned openings extending through the casing wall along one side of the casing only and opening into said bore; and
    a laterally moveable slide within said casing bore, said slide having a single concentric longitudinal bore extending through the length of the slide and a single row of linearly aligned openings through the slide along one side of the slide only and opening into said last said longitudinal bore, wherein lateral movement of the slide within the casing bore to a first position places all of the plurality of openings formed through the slide in alignment with the plurality of openings extending through the casing wall wherein all of the plurality of openings are in fluid communication through the slide bore, thereby opening the valve, and the lateral movement of the slide within the casing bore to a second position places all of the plurality of openings formed through the slide out of alignment with the plurality of openings through the casing wall so that none of the plurality of openings are in fluid communication through the slide bore, thereby closing the valve.

2. The valve of claim 1 wherein one each of said plurality of openings formed in the casing is in direct fluid communication with one each of the plurality of individual inflation zone of the cushion.

3. The valve of claim 1 wherein each of said openings formed through said casing further comprises a channel operatively connected to said casing bore.

4. The valve of claim 3 wherein each said channel extends outwardly from said casing and has a uniform diameter extending the length of the channel.

5. The valve of claim 1 wherein said slide further comprises a first end plug and a second end plug.

6. The valve of claim 1 wherein said slide further comprises an inflation apparatus operatively connected to one end thereof.

7. The valve of claim 1 further comprising detent apparatus to maintain said slide in said first or said second position.

8. The valve of claim 1 wherein the inflatable apparatus is a cushion having a base and a plurality of individual upstanding inflation cells on the base, the cells arranged in longitudinal and transverse rows with each cell occupying a longitudinal and transverse row, the cells divided into a plurality of inflation zones wherein the cells within an inflation zone are in fluid communication with the cells of that zone, but the generally not in fluid communication with cells of other of the plurality of inflation zones.

9. In a cushion having a base and an array of upstanding fluid filled cells on one side, said array of cells arranged in longitudinal and transverse rows with each cell occupying a longitudinal and transverse row, the cells being divided into a plurality of inflation zones, the zones generally not being in fluid connection with one another, a valve assembly for putting the generally isolated zones in fluid connection, comprising:
    an elongated casing having a longitudinal bore and a plurality of linearly aligned openings through the casing into said bore formed therein, one each of said plurality of openings being in fluid communication with one each of said plurality of inflation zones; and
    a slide within said casing bore, said slide having a longitudinal bore and a plurality of linearly aligned openings through the slide into said last said longitudinal bore formed therein, wherein lateral movement of the slide within the casing bore to a first position places the plurality of openings formed through the slide in alignment with the plurality of openings through the casing thereby opening the valve and placing the inflation zones in fluid communication with each other through the slide bore, and the lateral movement of the slide within the casing bore to a second position places the plurality of openings formed through the slide out of alignment with the plurality of openings through the casing thereby closing the valve and blocking fluid communication between the inflation zones.

10. The valve assembly of claim 9 further comprising an inflation apparatus operatively connected to the valve slide for inflating the cells in the individual inflation zones through the valve when the valve is in an open position and the individual inflation zones are in fluid communication thought the slide bore.

11. The valve assembly of claim 10 wherein said inflation apparatus is in a vehicle.

12. A cellular cushion comprising:
    a flexible base having a peripheral edge and a plurality of flexible hollow air containing cells fixed to and projecting upwardly from the base arranged in longitudinal and transverse rows with each cell occupying a longitudinal and transverse row, the cells being separated into independent pneumatic zones, an air filling valve for introducing air into the cells and a separate slide valve for selectively opening or closing an air flow path among said pneumatic zones during or after inflation, the valve comprising:
    a casing defining a longitudinal inner bore;
    linearly aligned independent fluid channels on said casing in cooperation with said longitudinal inner bore, one of each said fluid channels being in fluid communication with one each of the independent pneumatic zones;
    a laterally movable slide within said casing inner bore, said slide having a concentric longitudinal bore extending the length of the slide and linearly aligned fluid openings formed in the slide and in fluid communication with said slide bore, one each of said fluid openings being in alignment with one each of said independent fluid channels when said slide is in a first position within said casing bore thereby opening an air flow path among said zones through said slide bore, and each of said fluid openings being out of alignment with said independent fluid channels when said slide is in a second position within said casing bore thereby closing the air flow path among said zones through said slide bore.

13. The valve of claim 12 wherein said independent fluid channels are integrally attached to said casing.

14. The valve of claim 12 further comprising detent apparatus for securing said slide said first position and said second position.

15. The valve of claim 12 wherein said slide further comprises an inflation apparatus at one end thereof in fluid communication with the concentric bore extending the length of the slide, said inflation apparatus disposed to introduce air into the fluid cells through the air flow path when the air flow path among the zones is open.

16. A cellular cushion comprising a flexible base having a peripheral edge;

a plurality of flexible hollow air containing cells fixed to and projecting upwardly from the base in longitudinal and transverse rows, each cell occupying a longitudinal and a transverse row, the cells being separated into independent pneumatic zones;

a fluid conduit operatively connected to each of said independent pneumatic zones; and a valve for pneumatically permitting and interrupting air flow among said independent pneumatic zones, said valve including a casing defining a longitudinal inner bore, said casing having linearly aligned openings formed therein, said casing openings being in cooperation with said longitudinal inner bore, one of each said fluid conduits being in fluid communication with one each of said casing openings, a slide within said casing inner bore, said slide having a longitudinal bore and linearly aligned fluid openings formed therein and in fluid communication with said slide bore, one each of said fluid openings being in alignment with one each of said casing openings when said slide is moved laterally to a first position within said casing bore thereby permitting air flow among said independent pneumatic zones through said slide bore and said fluid openings being out of alignment with said casing openings when said slide is moved laterally to a second position within said casing bore thereby interrupting air flow among said zones through said slide bore.

17. The cushion of claim 16 wherein said flexible base further comprises a vacuum molded backing having fluid conduits formed therein.

18. A valve assembly for use with an inflatable apparatus having a plurality of flexible hollow air containing cells fixed to and projecting upwardly from the base in longitudinal and transverse rows, each cell occupying a longitudinal and a transverse row, the cells divided into a plurality of individual inflation zones comprising:

a substantially flat circular casing having a circumferential wall, a top wall and a bottom wall defining a circular inner chamber, the bottom wall having a plurality of openings formed therein;

a circular slide rotatably seated within said casing chamber, said slide having a top surface and a bottom surface, an annular groove formed in the top surface includes a plurality of openings formed through the groove extending from the top surface to the bottom surface; and an actuator arm operably connected to the slide to effect movement of the slide within the casing chamber, wherein rotation of the circular slide within the casing chamber to a first position places the plurality of openings formed through the slide groove in alignment with the plurality of openings in the second casing wall thereby opening the valve, and the rotation of the circular slide within the casing chamber to a second position places the plurality of openings formed through the slide groove out of alignment with the plurality of openings in the second casing wall thereby closing the valve.

19. A method of positioning a user on an inflatable cushion in a desired seating position, the cushion having a flexible base with a peripheral edge, a plurality of flexible hollow air cells fixed to and projecting upwardly from the base, the cells being separated into independent pneumatic zones, an inflation valve for introducing air into the cushion, air conduits operatively connected the independent pneumatic zones and terminating adjacent the peripheral edge, and a slide valve operatively connected to the air conduits, comprising:

opening the slide valve to open the air conduits allowing the conduits to be in fluid communication through the slide valve thereby placing the individual pneumatic zones in fluid communication through the slide valve;

opening the inflation valve;

introducing air into the air cells, the air flowing into cells of each pneumatic zone through the open slide valve;

inflating the cells until all of the cells of each pneumatic zone are inflated and in a state of equilibrium;

positioning the user on the cushion;

releasing air through the air-filling valve to immerse the user in the inflated air cells to a desirable immersion depth while maintaining the cells at essentially a same internal pressure through the open slide valve;

closing the inflation valve when the user achieves the desired immersion depth;

repositioning the user on the cushion to a desired seating posture arid redistributing air among the cells of the pneumatic zones until the cells in the inflation zones reach an equilibrium with the user positioned in the desired seating position; closing the valve slide to prevent air flow through the slide bore, thereby isolating the inflation zones in the state of equilibrium corresponding to the desired seating position.

20. The method of claim 19 wherein the step of releasing enough air to reach a desired immersion further comprised further comprises releasing enough air to bring an ischial region of the user to within about ½ inch of the cushion base.

* * * * *

UNITED STATES PATENT AND TRADEMARK OFFICE
CERTIFICATE OF CORRECTION

PATENT NO.    : 6,564,410 B2
DATED         : May 20, 2003
INVENTOR(S)   : Robert W. Graebe, Robert Klotz and Paul Rickman It is certified that error appears in the above-identified patent and that said Letters Patent is hereby corrected as shown below:

<u>Column 14,</u>
Line 40, replace "arid" with -- and --

Signed and Sealed this

Twenty-ninth Day of July, 2003

JAMES E. ROGAN
*Director of the United States Patent and Trademark Office*